United States Patent [19]

Goodman

[11] Patent Number: 4,459,746
[45] Date of Patent: Jul. 17, 1984

[54] TOOL FOR CLEANING THE EXPOSED END OF AN OPTICAL FIBER

[75] Inventor: Jack E. Goodman, Gaithersburg, Md.

[73] Assignee: Optelecom, Incorporated, Gaithersburg, Md.

[21] Appl. No.: 354,181

[22] Filed: Mar. 3, 1982

[51] Int. Cl.³ .............. B25F 3/00; B26B 1/00; B26B 3/00; B26B 11/00
[52] U.S. Cl. .............. 30/124; 29/558; 30/90.1; 30/164.9; 225/2; 225/96
[58] Field of Search ............ 30/92, 94, 95, 96, 115, 30/278, 90.1, 124, 123, 164.9, 136; 81/9.5 A; 29/558; 225/2, 96

[56] References Cited

U.S. PATENT DOCUMENTS

| | | | |
|---|---|---|---|
| 1,314,759 | 9/1919 | Silvernail | 30/90.1 |
| 2,359,644 | 10/1944 | Hoey | 30/164.9 X |
| 2,515,020 | 7/1950 | Scott | 30/164.9 |
| 3,114,277 | 12/1963 | Clendenin | 30/90.1 UX |
| 3,396,467 | 8/1968 | Scocozza | 30/95 |
| 4,059,893 | 11/1977 | Solury | 30/90.1 |
| 4,118,862 | 10/1978 | Hensel | 30/124 |
| 4,249,305 | 2/1981 | Basile | 30/164.9 |
| 4,262,417 | 4/1981 | Logan et al. | 30/164.9 |
| 4,392,398 | 7/1983 | Hoffman | 30/90.1 X |

Primary Examiner—Charlie T. Moon
Attorney, Agent, or Firm—Kerkam, Stowell, Kondracki & Clarke

[57] ABSTRACT

The invention discloses a method of forming a terminal for an optical fiber cable consisting of an optical fiber, a plastic buffer and at least a protective sheath. Also there is disclosed a tool for scribing the projecting end of the optical fiber so that the projecting end can be simply separated from the cable and the line of separation will be normal to the end of the terminal or connector. In a preferred embodiment the scribing tool has an equilateral triangular scribing element which selectively presents six active scribing surfaces.

6 Claims, 14 Drawing Figures

TOOL FOR CLEANING THE EXPOSED END OF AN OPTICAL FIBER

DESCRIPTION

1. Technical Field

This invention relates to a method of making a terminal for an optical fiber for a fiber optic transmission cable which terminal may be used to connect to another optical cable or for connection to a transmitter or a receiver or the like.

2. Background of Prior Art

Optical transmission cables are frequently composed of a high index of refraction core formed of, for example, fused silica (quartz), a lower index of refraction cladding, formed of glass or plastic, a plastic polymer coating or buffer and a plastic protective sheath.

Substantial problems exist in securing such optical cables in terminals which may be used to connect to another cable or for connection to a transmitter or a receiver or the like. The cable must be accurately aligned, such that the end of the core fiber or core and cladding will exactly mate with the end of a optical fiber of another optical cable or be exactly aligned with a transmitter or a receiver. Malfunctioning occurs when the end of the optical fiber protrudes from the end of the terminal, or where the optical fiber is recessed in the terminal or the end of the fiber is not perfectly parallel to the end of the terminal. Further problems exist when the connection between the optical cable and the connector are insufficient to prevent relative axial movement between the cable and the terminal. Any of the above conditions, will render the termination procedures inadequate for most optical cable uses.

BRIEF SUMMARY OF THE INVENTION

Throughout the specification and claims the words "optical fiber" mean the optical core and optical cladding in glass-glass fibers or the optical core or optical core and plastic cladding in a glass-plastic fiber.

It is an object of the present invention to provide a method of making an optical fiber termination for a fiber optic transmission cable wherein the terminal is securely attached to the optical cable; and the end of the optical fiber is flush with and parallel to the plane of the end of the terminal.

Another object is to provide a small, relatively inexpensive, simple to use tool for cutting or scribing the optical fiber flush with the end face of its terminal.

These and other objects and advantages are provided by a method of forming a terminal for an optical cable having at least an optical fiber; and a protective sheath, and wherein the terminal includes a clamp member having a bore therethrough and a ferrule threadably mateable with the clamp member which ferrule has a bore therein to snugglely receive the optical fiber and an end face transverse to the longitudinal axis of the optical fiber; the method comprising the steps: (1) removing the protective sheath; (2) inserting the stripped end of the cable in the clamp member and then feeding the optical fiber through the bore in the ferrule; (3) connecting the ferrule and clamp members together to securely hold the optical fiber in the terminal with a portion of the optical fiber projecting from the end thereof; (4) scribing the periphery of the optical fiber at the intersection of the fiber and the end of the ferrule; and (5) applying a longitudinal separating force between the terminal and the end of the optical fiber to separate the fiber at the scribed line.

The invention also includes a tool for cleaving the exposed end of the optical fiber of an optical cable flush with the end of a terminal secured to the optical cable comprising a housing; a terminal receiving receptacle in the housing and a glass scribing element associated with the housing. The glass scribing element includes means for mounting the scribing element with its scribing edge in operative relationship to the terminal received in the terminal receiving receptacle in the housing and spring means urging the scribing element into an inoperative relationship.

BRIEF DESCRIPTION OF THE DRAWINGS

The invention will be more particularly described in reference to the accompanying drawings wherein.

DETAILED DESCRIPTION OF THE INVENTION

Figure 1:
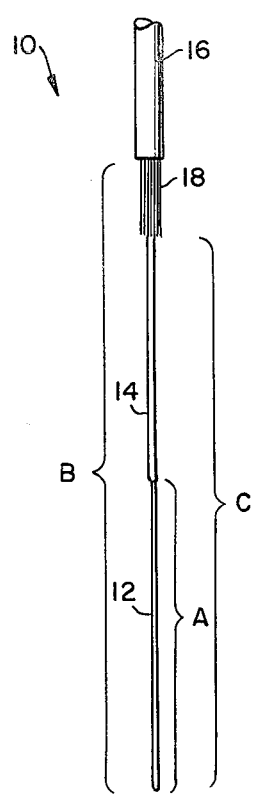
FIG. 1 illustrates a typical optical cable having a portion of the protective sheath removed therefrom.
Figure 2:
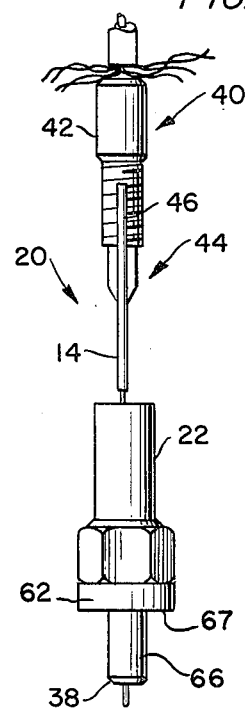
FIG. 2 illustrates the optical cable of FIG. 1 partially assembled within a metal terminal.
Figure 3:
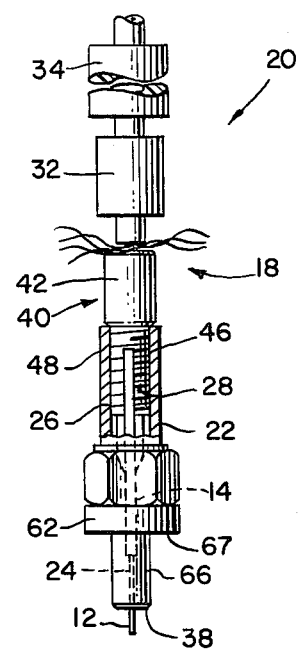
FIG. 3 illustrates diagrammatically a further step in assembling the terminal to the optical cable.
Figure 4:
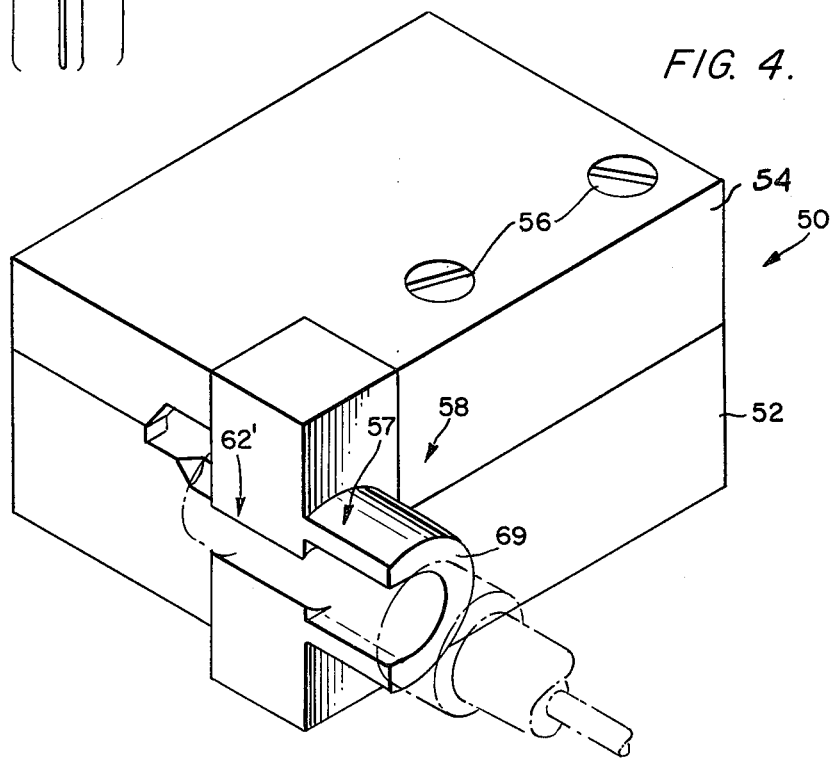
FIG. 4 is a perspective view of the optical fiber scribing and holding tool with a terminal containing an optical cable in operative relation thereto.
Figure 5:
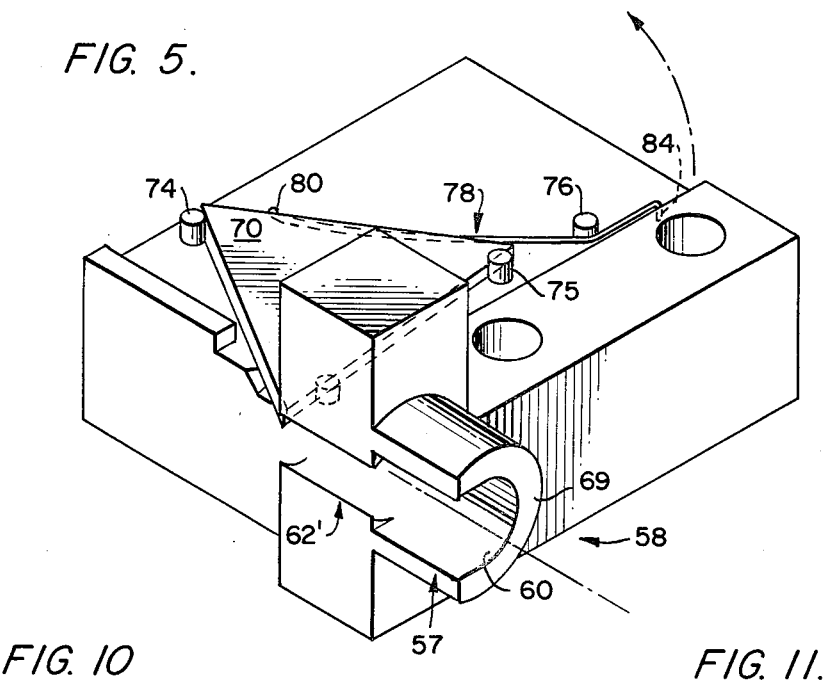
FIG. 5 is a view of the tool illustrated in FIG. 4 with the top cover removed to show the scribing tool.

Referring to the drawing and in particular to FIGS. 1, 2 and 3 thereof, 10 generally designates an optical cable consisting essentially of an optical fiber 12, a plastic fiber buffer 14 and a plastic protective sheath 16. The cable 10 may also include a plurality of strengthening fibers 18, positioned between the buffer 14 and the sheath 16.

The terminal 20 consists of a ferrule 22, having stepped bores longitudinally therethrough. The smallest bore 24 is sized to snugly receive the optical fiber 12, the next larger bore 26 is threaded, as at 28, to receive the threads 46 on the clamp member 40. Also in FIG. 3 is illustrated a shrink tube 34 which may be employed to provide a finish for the terminal.

Figure 12:
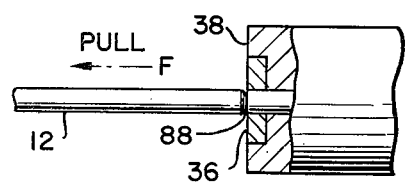
FIG. 12 diagrammatically illustrates a scribed fiber.
Figure 13:
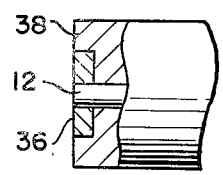
FIG. 13 illustrates a properly mounted fiber in the end of a terminal.

Further as illustrated in enlarged cross-section in FIGS. 12 and 13, the end of the terminal 22 may have a hard insert such as a bored sapphire insert 36 as a portion of its end face 38. The sapphire insert provides a block which prevents the scribing tool from defacing the flat end face 38 of the terminal all as to be more apparent to those skilled in the art from the further detailed discussion of the method and apparatus of the invention.

As illustrated in FIG. 2, the terminal includes the clamp member 40 which consists of the barrel portion 42, and an integral end collet portion 44, the upper end of which is externally threaded as at 46. The outside diameter of the rearward end portion 42 holds the strengthening fibers when the crimp ring 32 is slid thereover. The end or barrel portion 42 is bored to receive the optical fiber and its buffer 14. In FIG. 2, the clamp 40 and the ferrule 22 are shown in spaced apart relationship whereas in FIG. 3 the clamp 40 is shown in threaded engagement with the ferrule 22.

Attaching the Terminal to the end of an Optical Cable

The first step in assembling the terminal to the cable 10 is to prepare the end of the cable as illustrated in FIG. 1 by stripping the buffer from a portion designated A from the cable after the sheath 16 has been removed from the section of the cable designated B. In preparing the cable, it will be noted that where strength fibers 18 are employed in the assembly the strength fibers are removed in the zone designated C. Next a section, for example, a 1½ long heat shrinkable tubing 34 is slid onto the end of the cable, together with the, for example, brass crimp sleeve 32. Next, the prepared cable is slid into the, for example, brass clamp 40 and which is pushed backwardly to engage the outer jacket or sheath 16. Next the fiber 12 is carefully inserted into the ferrule 22 until it protrudes from the end 38, thereof, approximately ¾". Care should be taken in inserting the optic fiber 12 into the ferrule 22 due to the close tolerance of the bore 24 relative to the diameter of the optic fiber 12. It has been found that by slowly rotating the ferrule 22, as the fiber is gently pushed against the stepped bore in the ferrule, helps to properly align the fiber within the ferrule.

With the end of the optical fiber projecting from the end of ferrule, the clamp 40 is screwed tightly into the ferrule as illustrated in FIG. 3 of the drawing. Thereafter, the crimp ring 32 is slid over the outer surface 42 with the strength fibers 18 wedged between the inner surface of the crimp ring 32 and the outer surface 42 of the clamp 40. The ring 32 may then be crimped. Next the shrink tube is slid over the crimp ring and subjected to heat to make the finished attachment. This last step may be carried out after the optical fiber projecting from the end 38 of the ferrule has been separated from the terminal and the assembly carefully inspected.

Referring now to FIGS. 4 through 11, the cleaving tool for the optical fiber projecting from the end face 38 of the terminal 20 will be described. In these drawings, 50 generally designates the cleaving tool consisting of a base 52 and a top cover member 54. The top cover 54 is mounted to the base 52 via screws 56. Formed with the base is a terminal receiving receptacle generally designated 58. The terminal receiving receptacle 58 has a bore 60 therethrough sized to snugly receive the tip end portion 66 of the terminal as clearly illustrated in the drawings. It should be noted, particularly from FIG. 5 that there is a side opening 57 in the rearward portion of the terminal receiving receptacle along a side zone to receive the terminal tip end portion 66 to permit the terminal to be inserted therein in an arcuate pivoting motion diagrammatically illustrated in FIG. 6. The forward portion of the side opening designated 62' will not allow side entrance of the end portion 66 of the terminal. Once the inserted tip end 66 is in axial alignment with the partial bore in the terminal receiver 58 longitudinal sliding motion between the tool 50 and terminal 20, as illustrated by directional arrow G, FIGS. 6, 7, 8 and 10 accurately positions the projecting end of the optical fiber for scribing.

Figures 10, 11:
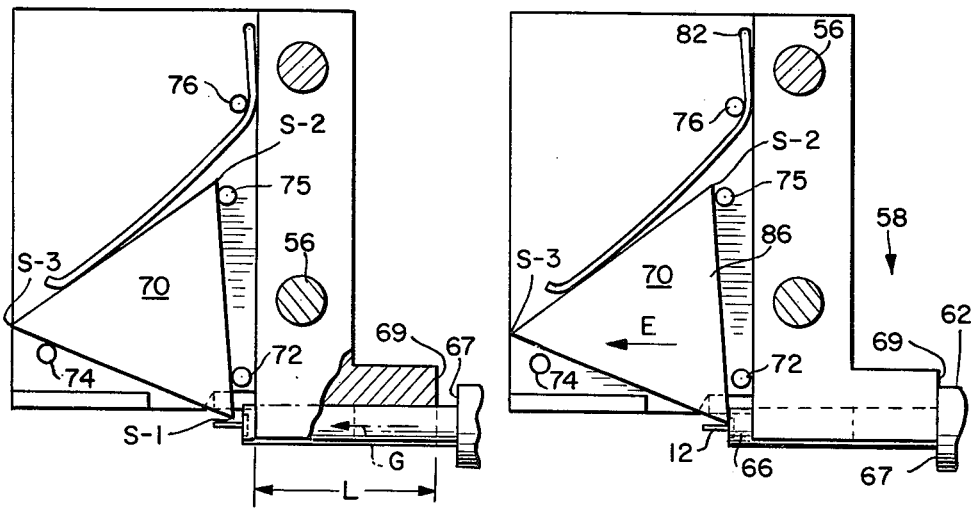
FIG. 10 is a view of the structure shown in FIG. 5 with a terminal being inserted in the terminal receiving receptacle thereof.
FIG. 11 illustrates the tool of FIGS. 5–10 with the terminal and optical fiber in the scribing position.

With particular reference to FIGS. 10 and 11, it will be noted that the length L of the receptacle 58 and length of the end portion 66 from face 38 to the shoulder 67 of boss 62 is such that when shoulder 67 is in engagement with end surface 69 of the receptacle 58 the face 38 is in proper position, relative to a scribing zone S-1, S-2 or S-3 of the scribing element 70, to scribe the optical fiber 12 in the plane of face 38 as shown in FIG. 11.

Figure 9:
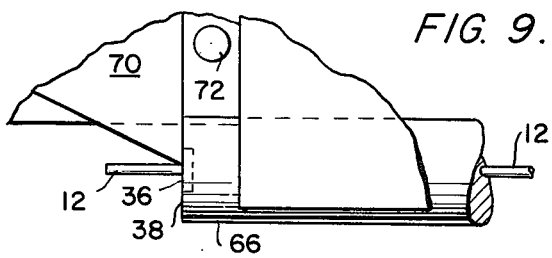

In FIGS. 6, 7, 8 and 10 the terminal is partially inserted in the terminal receiving receptacle 58 and in FIGS. 9 and 11, the terminal is fully received in the receptacle ready for scribing the end of the optical fiber 12.

With the terminal fully inserted in the tool, the tool is rotated about the terminal several turns to insure that the fiber is scribed completely about its circumference.

Figure 6:
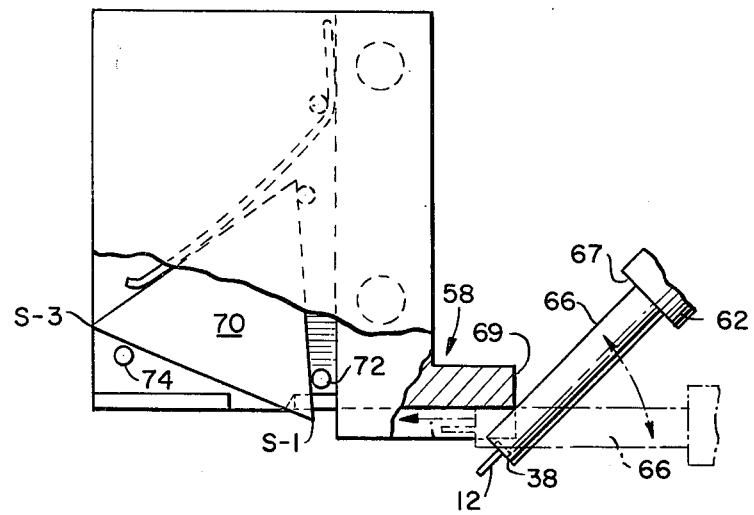
FIG. 6 illustrates a first step in inserting a terminal with an optical cable connected thereto in the scribing tool of the invention.
Figure 7:
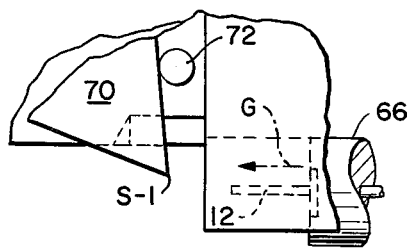
FIGS. 7, 8 and 9 illustrate successive steps during insertion and scribing of an optical fiber at the end of an optical cable terminal.
Figure 8:
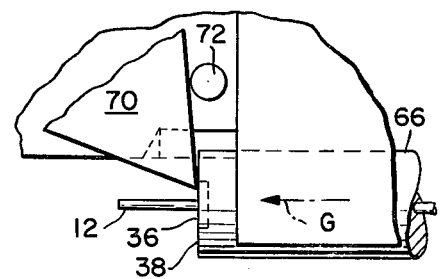

Moveably mounted on the top of the base portion 52 is the scribing element generally designated 70. The scribing element in the preferred form of the invention is configured as an equalateral triangle and thus has three scribing surfaces designated S-1, S-2 and S-3. Preferably the scribing element 70 is made of a hard material such as tungsten carbide or a metallic ceramic carbide, such as Ceromet, a commercial product sold by Kyocera, San Francisco, Calif. In a prototype the scribing element has a thickness of 0.032 inch and each leg has a length of about ⅜ inch. The scribing element is mounted to the top surface of the base 52 by three pins designated 72, 74 and 75. A fourth pin 76 cooperates with a spring 78 which has an extended arm 80 which bares against one of the legs of the scribing element as more clearly illustrated in FIGS. 5, 6, 10 and 11. The opposite end 82 of the spring is inserted in a bore 84 in the top surface of the base 52. With this arrangement, the cutter or scribing element 70 is normally urged by arm 80 of the spring 78 into engagement with the three pins 72, 74 and 75 as shown in FIGS. 6 and 10. However, when the terminal 20 is fully inserted in the terminal receiving receptacle 58 as illustrated in FIGS. 9 and 11, the end face 38 of the terminal presses against leg 86 of the scribing element 70 and urges the scribing tool in the direction of the directional arrow E, FIG. 11 to align a cutting or scribing edge such as S-1 or S-3 or S-5 as the case may be, with the projecting optical fiber 12. With the cutter and the terminal in this position, rotation of the cleaving tool causes the optical fiber to be scribed as diagrammatically illustrated at 88 in FIG. 12. Thereafter the terminal and scribed fiber are moved rearwardly and then pivoted to separate the terminal from the tool without breaking the scribed fiber from the terminal. Thereafter, an axial pulling force, as illustrated by directional arrow F, FIG. 12 separates the extended end of the optical fiber from the fiber remaining in the terminal as illustrated in FIG. 13.

Figure 14:
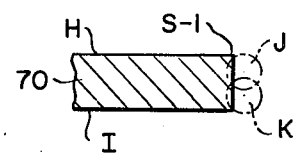
FIG. 14 illustrates two zones of the scribing element in relation to an optical fiber to be scribed.

The thickness of the scribing element 70, in a preferred embodiment of the invention is such that the triangular scribing element actually has a total of six cutting surfaces or zones. Referring to FIG. 14, illustrating cutting edge S-1, one of the cutting zones is adjacent surface H of the cutter 70 and the other is adjacent surface I so that depending on whether surface H or I is downwardly positioned relative to the base 52, the fiber would be cleaved at zones J or K as diagrammatically illustrated in FIG. 14. Which zone J or K will be in active engagement with the extended end of the optical fiber as shown in FIG. 11, is determined by which surface of the scribing element is positioned downwardly in respect to the base of the cutter tool 52. In order to reverse the tool or to bring a new cutting edge S-1, S-2, S-3, into the active cutting position, the pair of screws 56 are removed to remove the cover and then the "floating" scribing element 70 is repositioned against the three quide pins 72, 74 and 75.

It is generally advisable to inspect the end 38 of the terminal to determine if the fiber has been properly cleaved. It has been found that if the fiber end protrudes from the end 38 of the ferrule the condition indicates that the ferrule was not firmly seated within the receptacle 58 of the cleaving tool while the tool was rotated or that too much force was required to break the fiber after scribing and a short length thereof was pulled through the terminal.

Another condition that could exist is that the fiber did not break straight across and thus the fiber is not uniformily flush with the end 38 of the ferrule. This condition generally indicates that the cleaving tool did not scribe the fiber all the way around. This condition could result from not having the ferrule not firmly seated in the receiving socket 58 or the particular edge of the scribbing tool 70 was damaged.

Another faulty condition results when the terminal was not sufficiently secured to the fiber cable. This results in the fiber end being recessed in the ferrule.

Statement of Industrial Application

A process and means are provided whereby terminations or connectors for optical fibers are simply and reducably provided, whereby the end of the optical fiber of the cable is positioned flush with the end of the connector or terminal and the end of the fiber is precisely normal to the optical axis thereof.

I claim:

1. A tool for cleaving the exposed end of the optical fiber of an optical cable at the end of a terminal having an end face transverse to the longitudinal axis of the optical cable and secured to the optical cable, comprising a rotatable housing; a terminal receiving receptacle in said housing; a generally flat polygonal glass scribing element defining corner scribing edge; means floatingly mounting said scribing element to said housing and spring means urging said scribing element into a inoperative relationship to the optical cable; said scribing element urged against the urging of the spring means by the end face of the terminal when said terminal is fully received in the terminal receiving receptacle in said housing to an operative scribing relationship to the fiber.

2. The tool defined in claim 1 wherein the scribing elements is configured as an equilateral triangle.

3. The tool defined in claim 2 wherein the scribing surfaces of the scribing element comprise each apex of the equilateral triangle.

4. The tool defined in claim 3 wherein the scribing element is positioned with any one of the triangular apices in a scribing position in the housing.

5. The tool defined in claim 4 whrein the scribing tool has a thickness selected such that each apex thereof has two scribing zones.

6. The tool defined in claim 2 wherein the scribing element is mounted in a floating arrangement which floating arrangement comprises three pins mounted in the housing, two of which engage one leg of the triangular element and one pin engages another leg and the spring means engages the third leg.

* * * * *